United States Patent [19]

Veitl et al.

[11] 3,915,666

[45] Oct. 28, 1975

[54] STEEL COMPOSITE HAVING RESISTANCE TO CARBON DIFFUSION

[75] Inventors: Giswalt Veitl, Linz; Herbert Zitter, Kapfenberg, both of Austria

[73] Assignee: Vereinigte Osterreichische Eisen- und Stahlwerke Aktiengesellschaft, Linz, Austria

[22] Filed: Aug. 9, 1974

[21] Appl. No.: 496,213

Related U.S. Application Data

[63] Continuation of Ser. No. 245,237, April 18, 1972, abandoned.

[30] Foreign Application Priority Data

Apr. 28, 1971 Austria ............................. 3647/71

[52] U.S. Cl................................. 29/196.1; 148/34
[51] Int. Cl.² ........................................ B32B 15/18
[58] Field of Search...................... 29/196.1; 148/34

[56] References Cited
UNITED STATES PATENTS

| | | | |
|---|---|---|---|
| 2,963,129 | 12/1960 | Eberle | 29/196.1 |
| 3,489,618 | 1/1970 | Holtzman | 148/34 X |
| 3,537,828 | 11/1970 | Henrickson et al | 29/196.1 |

*Primary Examiner*—L. Dewayne Rutledge
*Assistant Examiner*—Arthur J. Steiner
*Attorney, Agent, or Firm*—Burns, Doane, Swecker & Mathis

[57] ABSTRACT

The invention relates to a clad moulded body comprising a base body of carbon containing steel and a carbon diffusion inhibiting a layer joining to said base body and representing an intermediate layer to a cladding layer of highly alloyed, preferably corrosion resistant steel, or being such cladding layer itself, wherein the improvement resides in that such layer joining said base body is made of a steel comprising 0.05 %, 1.0 to 6 % Si, 1.0 to 12 % Mn, and 0 to 0.8 % N. The main advantage gained by employing such steel lies in avoiding an excessive decarburization at the transition from the base material to the intermediate layer, and an excessive carburization immediately in the area of the bonding plane.

3 Claims, 2 Drawing Figures

STEEL COMPOSITE HAVING RESISTANCE TO CARBON DIFFUSION

This is a continuation, of application Ser. No. 245,237, filed Apr. 18, 1972, now abandoned.

The invention relates to a clad moulded body particularly a sheet, comprising a base body of carbon containing steel, and a layer joining to said base body and inhibiting carbon diffusion, representing an intermediate layer to a cladding layer of highly alloyed preferably corrosion resistant steel, or being such cladding layer itself.

Clad sheets may be produced by hot rolling a sandwich sealed at the margin, comprising two panels of the base material, the base material being arranged on the outside, and the cladding layers, which are to be bonded with the base material, being arranged on the inside; after rolling the sandwich is divided and each clad sheet is separately further processed. Clad sheets ordinarily comprise a baseplate made of a base material which possesses the desired strength, and a corrosion resistant cladding layer. In order to obtain the required strength the base material has to contain a certain minimum amount of carbon only part of which may be replaced by a higher content of manganese. The corrosion resistant cladding layer, however, should contain as low a carbon content as possible, so as to prevent intergranular corrosion. Already when these sheets are produced, e.g. when the base material and the cladding layer material are hot rolled at the same time, a carbon diffusion from the base material to the cladding layer and thus an undesired carburization of the cladding layer may take place as soon as an intimate bonding between the base and the cladding materials has been effected after the first roll passes; as a rule the rolled sheet then has a temperature of about or below 900°C. A second possibility of carbon diffusion from the base material into the corrosion resistant cladding layer is given when the finished sheets are subjected to heat treatment, e.g. to normalizing annealing. This heat treatment is normally carried out at about 900°C. With progressing carbon diffusion the cladding layer is carburized to an extent where it is no longer corrosion resistant over its entire thickness which amounts to about 2 to 3 mm. Therefore, there is a need for providing an intermediate layer which prevents or inhibits the carbon diffusion from the base material to the cladding layer, but does not deteriorate or essentially change the weldability and the other properties of the clad sheets.

In order to solve this problem it has already been proposed to provide a thin layer of pure nickel having a thickness of about 0.03 to 0.3 mm between the base material and the cladding layer. Tests have shown, however, that the carbon diffusion from the base material into the corrosion resistant cladding layer is not essentially inhibited by an intermediate layer of nickel. Independently of the thickness of the pure nickel layer a carburized zone having a thickness of 0.8 to 1 mm was formed after annealing a clad sheet at 1000°C, a holding time of 4 hours, and subsequent cooling in quiet air. Further, it was found that the weldability of such clad sheets is impaired when the nickel layer is thicker than 0.2 mm, which represents an additional disadvantage. Then cracks may occur in the welding seam. Seeing that the nickel layer itself is not corrosion resistant such sheets are rated only in consideration of the corrosion resistant cladding layer; the additional costs for the nickel layer represent a loss.

It has also been proposed to use Monel metal as intermediate layer; Monel Metal consists of 67 % nickel, 30 % copper, balance iron and manganese. It has been found that Monel metal is not superior to nickel with regard to carbon diffusion. The weldability of clad sheets having an intermediate layer of Monel metal is absolutely unsatisfactory. The copper content is responsible for the occurrence of cracks in the welding seam.

Finally, clad sheets are known which are produced by hot rolling cladding sandwiches whereby substances binding nitrogen and oxygen are used; these substances are heated to reaction temperature prior to heating the cladding sandwich and after sealing the pack edges while the cladding materials themselves remain almost at room temperature. In these procedures the oxygen and nitrogen binding means are deposited in thin layers on the inner side of the base material sheets. According to a further proposal an intermediate layer made of metal which firmly binds the carbon or in which the carbon is insoluble is to be deposited onto the surfaces of the base material apposed to each other and/or of the cladding sheet. This intermediate metal layer is to be composed e.g. of molybdenum or of steels with special carbide formers, such as tantalium niobium, titanium or of steels with a chromium content of more than 12 %. The disadvantage of this method lies in the fact that such carbide formers have to be added in considerable amounts so that the thin intermediate layer is hardened. When the clad sheets are further processed in cold condition cracks may occur at this place. The carbon content of the base material is also reduced, i.e. the strength is diminished. Furthermore, the weldability of the sheets is deteriorated.

In this further processing in cold condition it was shown that in the case of extreme cold shaping microscopic cracks may occur in the bonding plane owing to too great tensions. The term extreme cold shaping is to be understood to refer to bending of the sheets by 180° without mandrel or to cold-flanging a circular blank to a floor but not to coiling a sheet. In clad sheets comprising a base material and a highly alloyed, corrosion resistant cladding layer of a customary composition of chromium-nickel-steel, a thin layer rich in carbide is formed in the bonding plane depending on the heat treatment; the composition of these carbides corresponds to the formula $M_{23}C_6$ or $M_7C_3$ or mixtures of these carbide types are present. These carbides segregate preferably at the grain boundaries of the austenitic steel (of the cladding layer) and act like wedges in extreme cold shaping which then cause these microcracks.

The invention pursues the task to create cold shapeable clad sheets in which even after extreme cold shaping no micro-cracks occur in the bonding plane. In a clad moulded body of the kind defined in the introduction the invention resides in that the cladding layer or intermediate layer, respectively, joining to the base body, is made of steel including up to 0.05 % C, 1.0 to 6 % Si, 1.0 to 12 % Mn and, if desired, up to 0.8 % N. silicon and manganese side by side with nickel oxygen and nitrogen belong to those element which reduce the tendency for carburization of the clad moulded body in the bonding plane. Silicon and manganese thus may to a certain degree be mutually interchanged i.e. when a high silicon content is given, a low manganese content can be chosen and vice versa. The nitrogen content of the steel, which customarily owing to melting conditions amounts to about 0.03 % can additionally be adjusted to higher values to reinforce the elements silicon and manganese which brake carburization. The layer inhibiting carbon diffusion or carbide enrichment respectively, is similar is kind to the corrosion resistant cladding layer whereby a second aim of the invention is achieved, which resides in that the cladding layer be resistant against a corrosion attack over its total thickness.

Preferably the steel of the cladding layer or intermediate layer has the following composition: up to 0.03 % C, 3.5 to 4.5 % Si, 1 to 2 % Mn, up to 0.025 % P, up to 0.020 % S, 12 to 25 % Cr, preferably 17 to 19 % Cr and 8 to 25 % Ni, preferably 14 to 16 % Ni, balance Fe und customary impurities.

The intermediate layer joining to the base body should suitably have a thickness of at least 0.02 mm.

In order that the invention may be more fully understood, it shall now be explained by way of example with reference to the accompanying drawings, wherein.

Figure 1:
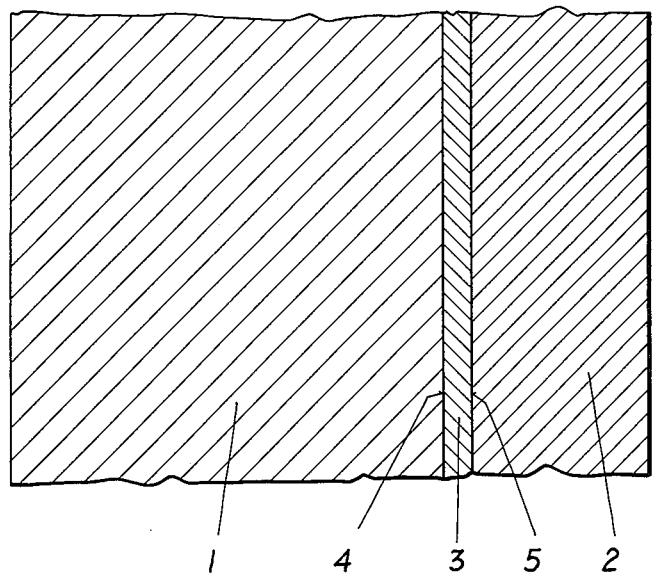
FIG. 1 is a schematical sectional view of a clad sheet.
Figure 2:
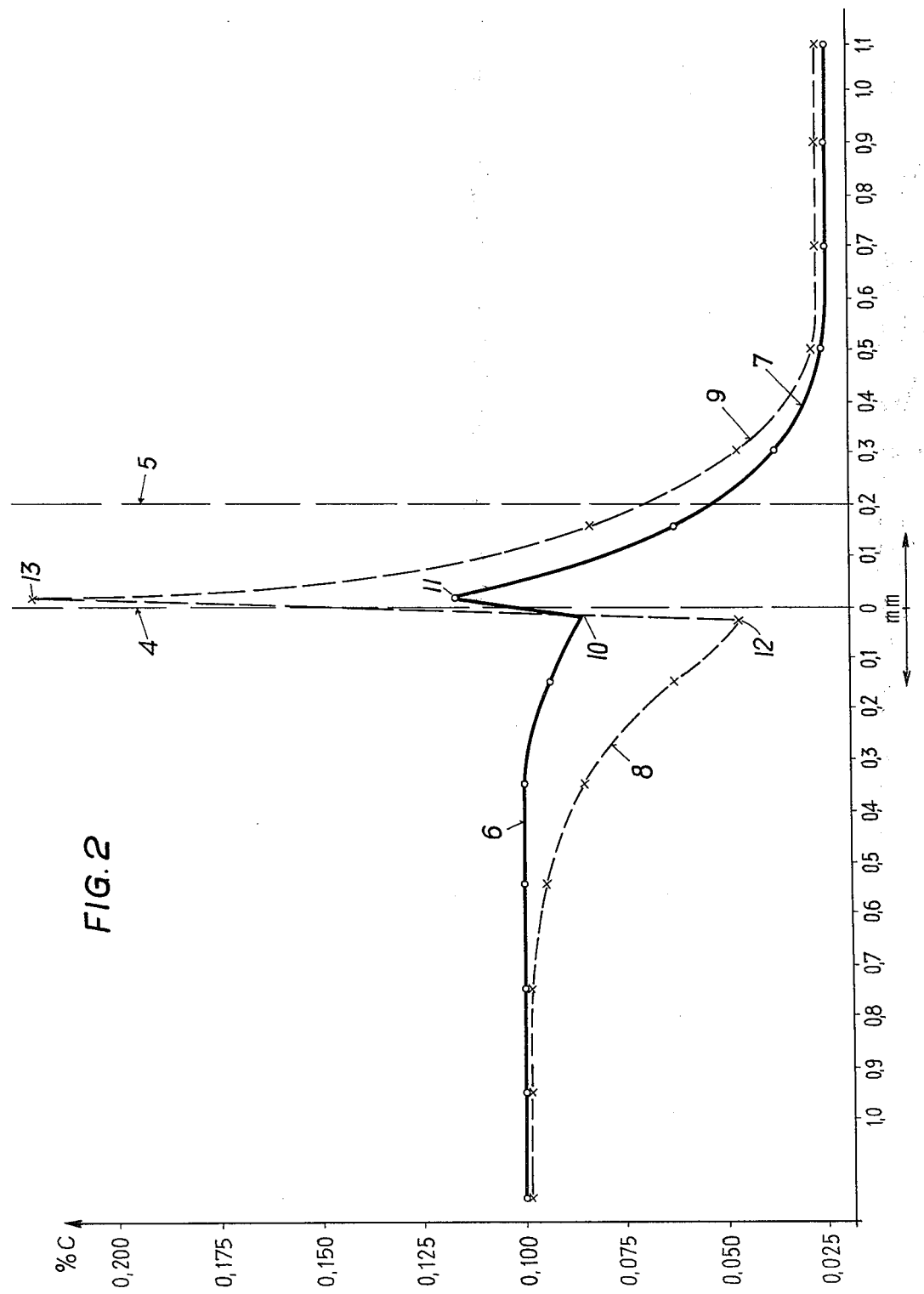
FIG. 2 is a graph showing the body, of the carbon content in the base material, in the intermediate layer and in the cladding layer after a heat treatment at 940° C, in which the holding time lasted 2 hours, and subsequent cooling of the sheet at quiet air.

In FIG. 1 numeral 1 denotes a base plate whose thickness — measured on the finished clad sheet — amounted to 8 mm. The base material had the following composition: 0.10 % C, 0.45 % Si, 1.2 % Mn, 0.022 % P, 0.019 % S, 0.032 % Al, 0.08 % Cr, 0.05 % Ni, 0.02 % Mo, 0.004 % N. The intermediate layer 3 was 0.2 mm thick and had the following composition: 0.03 % C, 4.23 % Si, 1.56 % Mn, 0.020 % P, 0.006 % S, 0.003 % Al, 18.3 % Cr, 14.6 % Ni, 0.12 % N. The cladding layer 2 was 1.8 mm thick and was made of chromium-nickel-steel. Thus, the entire thickness of the clad sheet amounted to 10 mm. In FIG. 1 and FIG. 2 numeral 4 denotes the bonding surface between the base plate 1 and the intermediate layer 3. Between the intermediate layer 3 and the cladding layer 2 a further bonding surface 5 is present.

In FIG. 2 on the abscissa the distance from the bonding plane 4 is given in both directions in mm. On the ordinate the carbon content is indicated in %. The course of the carbon concentration over the sheet cross section given in this diagram was determined by an analysis of chips which were planed off in layers and by means of a microprobe. The curve drawn in a solid line 6 shows the course of the carbon content from the base plate 1 towards the intermediate layer 3. The curve 7 shows the course of the carbon content within the intermediate layer 3 and in the area of the cladding layer 2. Numerals 8 and 9 denote the corresponding curves for the carbon content of sheets produced and heat-treated in the same way, but having no intermediate layer according to the invention; the control sheets thus were composed of an 8 mm thick base plate 1 and a 2 mm thick cladding layer 2, and the compositions of the cladding and base materials were identical to the compositions of the clad steel having an intermediate layer.

FIG. 2 shows clearly that the carbon content decreases slightly at the transition area from the base material to the intermediate layer 3 and increases comparatively little immediately in the area of the bonding plate 4; the deepest value is denoted with 10 in the transition area and the highest value with 11. Immediately after the bonding plane 4 the carbon content decreases greatly. When no intermediate layer is used a broad decarburized one is created in front of the bonding plane 4; the deepest value of the carbon content is denoted with 12 and lies below 0.05 %. Immediately in the area of the bonding plane 4 a highly carburized zone is present, the highest carbon content of which is denoted with 13 and — as may be derived from FIG. 2 — lies up to more than 100 % higher than the initial carbon content of the base material of 0.10 %. In the area of the bonding plane 4 a strong enrichment of carbides occurs, which in extreme cold shaping cause the formation of micro cracks.

If — without intermediate layer — the silicon, manganese and, if desired, nitrogen containing steel according to the invention is used as cladding layer and the thickness of the cladding layer amounts to 2 mm, no change may be found in the course of the curves 6 and 7; the steel according to the invention may be used both as intermediate layer for other cladding materials and for the cladding material itself.

The main advantage of using a silicon, manganese and, if desired, nitrogen containing steel with a maximum carbon content of 0.05 % lies in that an excessive decarburization in the transition from the base material to the intermediate layer, and an excessive carburization immediately in the area of the bonding plane is avoided, so that the clad sheet is excellently suitable for being cold shaped.

What we claim is:

1. A cold-shapable composite body having increased resistance to carbon diffusion across the body at elevated temperatures which consist essentially of a carbon-containing steel base body, an intermediate carbon diffusion inhibiting steel layer bonded to said steel base, said intermediate layer consisting essentially of up to to 0.05 % C, 1.0 to 6 % Si, 1.0 to 12 % Mn, 0 to 0.8 % N, 0 to 0.025 % P, 0 to 0.020 % S, 12 to 25 % Cr, 8 to 25 % Ni, balance Fe, and a cladding layer bonded to said intermediate layer, said cladding layer consisting essentially of a low carbon-containing, highly alloyed, corrosion resistant steel, wherein said intermediate layer substantially prevents carbon diffusion from the base body to the cladding layer and carbide enrichment in said intermediate layer, the carbon content of the base body and the cladding layer being such that carbon would tend to diffuse from the base body into the cladding layer at a bonding therebetween at elevated temperatures in the absence of the said intermediate carbon diffusing layer.

2. The composite body of claim 1 wherein said intermediate layer consists essentially of 0 to 0.03 % C, 3.5 to 4.5 % Si, 1 to 2 % Mn, 0 to 0.025 % P, 0 to 0.020 % S, 17 to 19 % Cr, and 14 to 16 % Ni.

3. The composite body of claim 2 wherein said intermediate layer has a thickness of at least about 0.02 mm.

* * * * *